W. Pratt
Cutter-Holder.
N° 79,684. Patented Jul. 7, 1868.
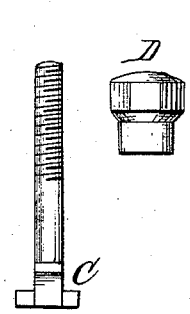
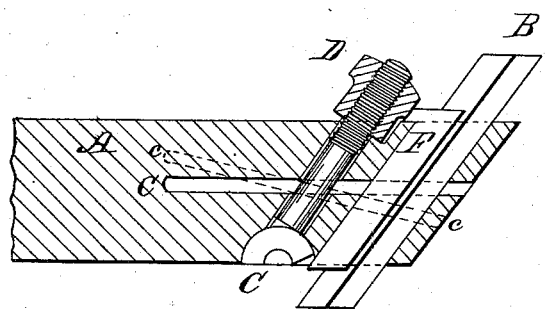
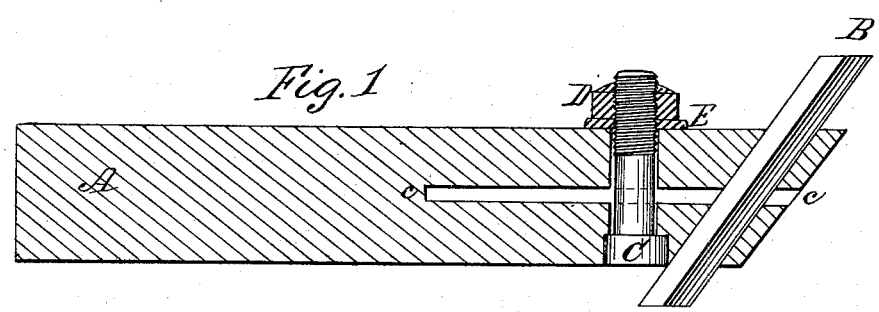
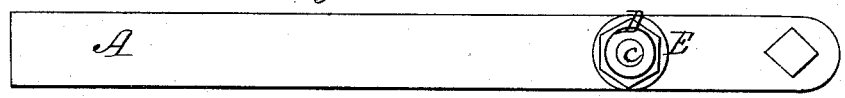
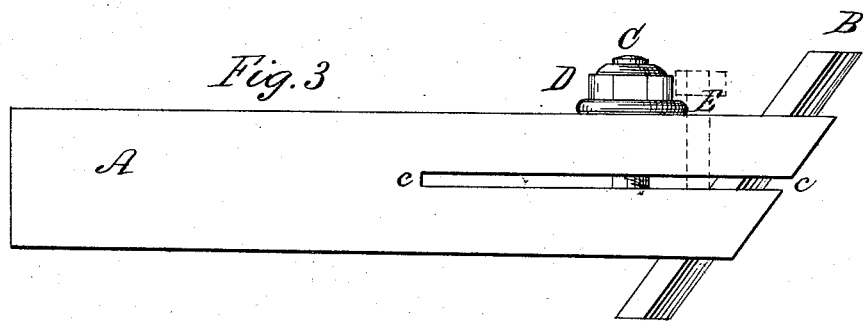
Witnesses,
Inventor,
Wm Pratt.

United States Patent Office.

WILLIAM PRATT, OF PROVIDENCE, RHODE ISLAND.

Letters Patent No. 79,684, dated July 7, 1868.

IMPROVED TOOL-HOLDER.

The Schedule referred to in these Letters Patent and making part of the same.

TO ALL WHOM IT MAY CONCERN:

Be it known that I, WILLIAM PRATT, of the city and county of Providence, and State of Rhode Island, have made certain Improvements in Tool-Holders, or stocks for the cutters of engine-lathes and planing-machines; and in order that others skilled may understand the nature of my invention, I give the following description thereof, illustrated by the accompanying drawings, and referred to in these specifications by the letters and figures marked thereon.

Description of Drawings.

Figure 1 is a view, mostly in longitudinal vertical section, with a cutter inserted ready for use.

Figure 2 is a top view of the same with the cutter omitted.

Figure 3 is a side view of the holder with cutter.

The same letters refer to the same parts as seen in all the figures.

A is a bar of iron or steel, of suitable size for the tool-post of the machine for which it is to be used. This bar is planed or milled equally, and straight as well as parallel on its four sides. One end of this is cut at a suitable angle for the insertion of the cutter, so that the point of this overhangs the base in such degree that it may be brought to the work without interfering with the stock, and also to give a suitable angle to the point of the cutter.

The bar A has a mortise through the chamfered or angular end, and (as shown in the drawing) placed diamond-wise in its relation to the sides of the holder. A bar of steel, B, is fitted snugly to this mortise, so that it will move up and down, and yet without play, before the tightening-device is brought to bear upon it.

The means of tightening the cutter and holding it firmly in place are next to be described.

After the bar A is finished, (so far as the shaping of the sides and ends, and the broaching of the mortise truly to receive the cutter,) a hole is drilled through the bar A, and countersunk on the under side to receive the headed screw-bolt C, the hole in the bar, which receives the shank of the screw, being made large enough to allow of a little free motion, while the head is snugly fitted, and preferably a little tapering. A nut, D, is fitted to the upper end of the screw-bolt C, underneath which is the washer E.

After these parts are all fitted, the bar A is slotted at c c, about midway of the perpendicular section, far back enough to allow the screw-bolt C and the nut D to spring and hold the angular ends of the holder a little nearer together than they would be without this force applied.

It will be seen that if the tool or cutter B is accurately fitted to the mortise, the bringing together of the slotted end of the bar will hold it firmly for work. To raise the tool, or to lower it, or to remove it altogether, it is only necessary to release the nut D, and the spring of the parts will allow it to slip again in the mortise.

The different views in Figure 4 show a modification of the parts in form and position, without any change in the principles of construction.

The same letters refer to like parts in these as in the drawings already described.

The screw-bolt D in this view is placed at the same angle as the cutter, and instead of having an ordinary screw-bolt head, has one shaped as seen in side view in the holder in section, and also detached in a back view. This head is a semicircle, with two smaller semicircular trunnions. The seating of this head is milled out on the under side of the bar A, of just the size of the parts of the head, so that while only the semicircular trunnions appear on the surface of the bar, yet the bearing is upon the larger semicircle as well.

The nut D has a seat milled or countersunk in the upper face of the cutter-holder A, at right angles, as regards the seating, with the screw-bolt C. This throws the nut further forward on the bar than where the bolt runs perpendicularly through the bar. The slot c c may be varied in direction and position to suit the kind of holder for special machines. This variation is represented by the red lines in this figure.

I am aware that various devices have been in existence for tool-holders, both patented and unpatented, but they fasten the cutter in an entirely different manner, and by means much more complicated; and in instruments of this class, simplicity of manufacture, few parts, and those of forms easily made, is a very desirable object.

Therefore, while I make no claim to a tool-holder in which the cutter is fastened by means of gibs and wedges or screw-gibs, nor to a "tool-holder" in which the cutter is held by means of clamping the two sides of the holder together against the cutter, as in stocks where the bar is slotted perpendicularly in line with the cutter, I do not confine myself to the exact forms of all the parts described; for instance, the two limbs of the slotted end of the holder or bar may be sprung slightly apart by means of a set-screw working through one limb of the slotted bar and abutting against the other, as seen in red lines in fig. 3, the practical effect being the same; hence,

What I claim is—

A tool-holder, carrying an independent cutter, for engine-lathes and planing-machines, in which the bar or stock A is slotted transversely to the vertical line of the cutter, dividing the mortised end of the bar A into an upper and lower limb; and the fastening of the cutter by drawing these limbs together with a screw-bolt and nut, or by spreading them apart by means of a set-screw passing through one limb and abutting against the other, all made and operating substantially as described, or their mechanical equivalents.

WM. PRATT.

Witnesses:
  WM. H. BEAN,
  SAM'L H. ANTHONY.